US012589944B2

(12) United States Patent
Tobayama

(10) Patent No.: US 12,589,944 B2
(45) Date of Patent: Mar. 31, 2026

(54) TRAY FOR PHYSICAL DISTRIBUTION SORTER AND ARTICLE SORTING APPARATUS

(71) Applicant: KABUSHIKI KAISHA TOSHIBA, Tokyo (JP)

(72) Inventor: Kyouichi Tobayama, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 0 days.

(21) Appl. No.: 18/630,076

(22) Filed: Apr. 9, 2024

(65) Prior Publication Data

US 2024/0253906 A1 Aug. 1, 2024

Related U.S. Application Data

(63) Continuation of application No. PCT/JP2022/038062, filed on Oct. 12, 2022.

(30) Foreign Application Priority Data

Oct. 19, 2021 (JP) ................................. 2021-170943

(51) Int. Cl.
*B65G 17/34* (2006.01)
*B65G 47/51* (2006.01)
*B65G 47/61* (2006.01)

(52) U.S. Cl.
CPC ......... *B65G 17/34* (2013.01); *B65G 47/5122* (2013.01); *B65G 47/61* (2013.01)

(58) Field of Classification Search
None
See application file for complete search history.

(56) References Cited

U.S. PATENT DOCUMENTS 10,974,913 B1 * 4/2021 Nussbaum ........... B65G 47/962
11,325,789 B2 * 5/2022 Ueda ...................... B65G 47/96
(Continued)

FOREIGN PATENT DOCUMENTS

CN 105109910 A 12/2015
CN 109499890 A * 3/2019 ............... B07C 3/02
(Continued)

OTHER PUBLICATIONS

Japan Patent office, Int'l Search Report in PCT/JP2022/038062, 2 pages (Dec. 20, 2022).
(Continued)

*Primary Examiner* — Kavel Singh
(74) *Attorney, Agent, or Firm* — Finnegan, Henderson, Farabow, Garrett & Dunner, LLP

(57) ABSTRACT

According to an embodiment, a tray for a physical distribution sorter includes a frame body, first and second pulleys, first and second rotating plates, and a wire. The frame body moves in a predetermined direction on a track of the physical distribution sorter. The first and second pulleys rotate about a predetermined axis with respect to the frame body. The first rotating plates rotate with rotation of the first pulley. The second rotating plate rotates with rotation of the second pulley. The wire is wound around the first and second pulleys. When the wire is unwound from the second pulley and wound around the first pulley, the first and second rotating plates rotate and close. When the wire is unwound from the first pulley and wound around the second pulley, the first and second rotating plates rotate and open in a double-open manner.

9 Claims, 12 Drawing Sheets

(56) References Cited

U.S. PATENT DOCUMENTS

| | | | | |
|---|---|---|---|---|
| 11,795,013 B2 * | 10/2023 | Ueda | ...................... | B65G 47/68 |
| 11,802,008 B2 * | 10/2023 | Christen | .............. | B65G 47/525 |
| 11,807,474 B2 * | 11/2023 | Mignano | ................ | B65G 47/42 |
| 12,110,191 B2 * | 10/2024 | Balk | ...................... | B65G 15/44 |
| 2005/0061614 A1 | 3/2005 | Balk et al. | | |

FOREIGN PATENT DOCUMENTS

| | | | | | |
|---|---|---|---|---|---|
| CN | 109516112 A | * | 3/2019 | ............. | B65G 35/00 |
| CN | 110102484 A | | 8/2019 | | |
| CN | 109516112 B | * | 4/2024 | ............. | B65G 35/00 |
| CN | 119460596 A | * | 2/2025 | ............. | B65G 47/22 |
| JP | 2005-511447 A | | 4/2005 | | |
| KR | 10-2017-0052216 A | | 5/2017 | | |
| WO | WO 03/042080 A1 | | 5/2003 | | |

OTHER PUBLICATIONS

Canadian Intellectual Property Office, Office Action in CA App. No. 3,233,958 (Sep. 12, 2025).

Japan Patent Office, Office Action in JP App. No. 2021-170943 (Aug. 5, 2025).

Japan Patent Office, Office Action in JP App. No. 2021-170493 (Aug. 5, 2025).

* cited by examiner

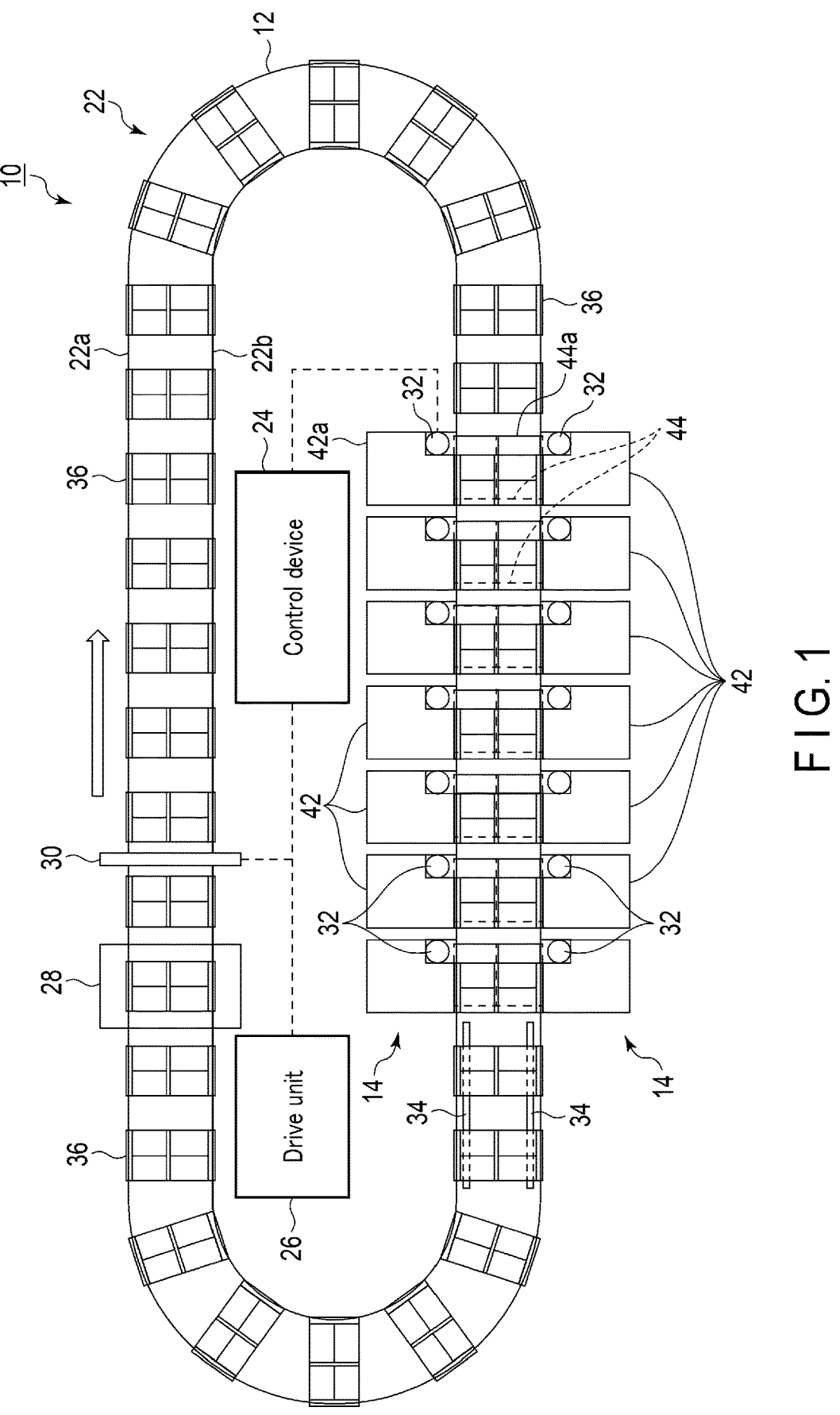
F I G. 1

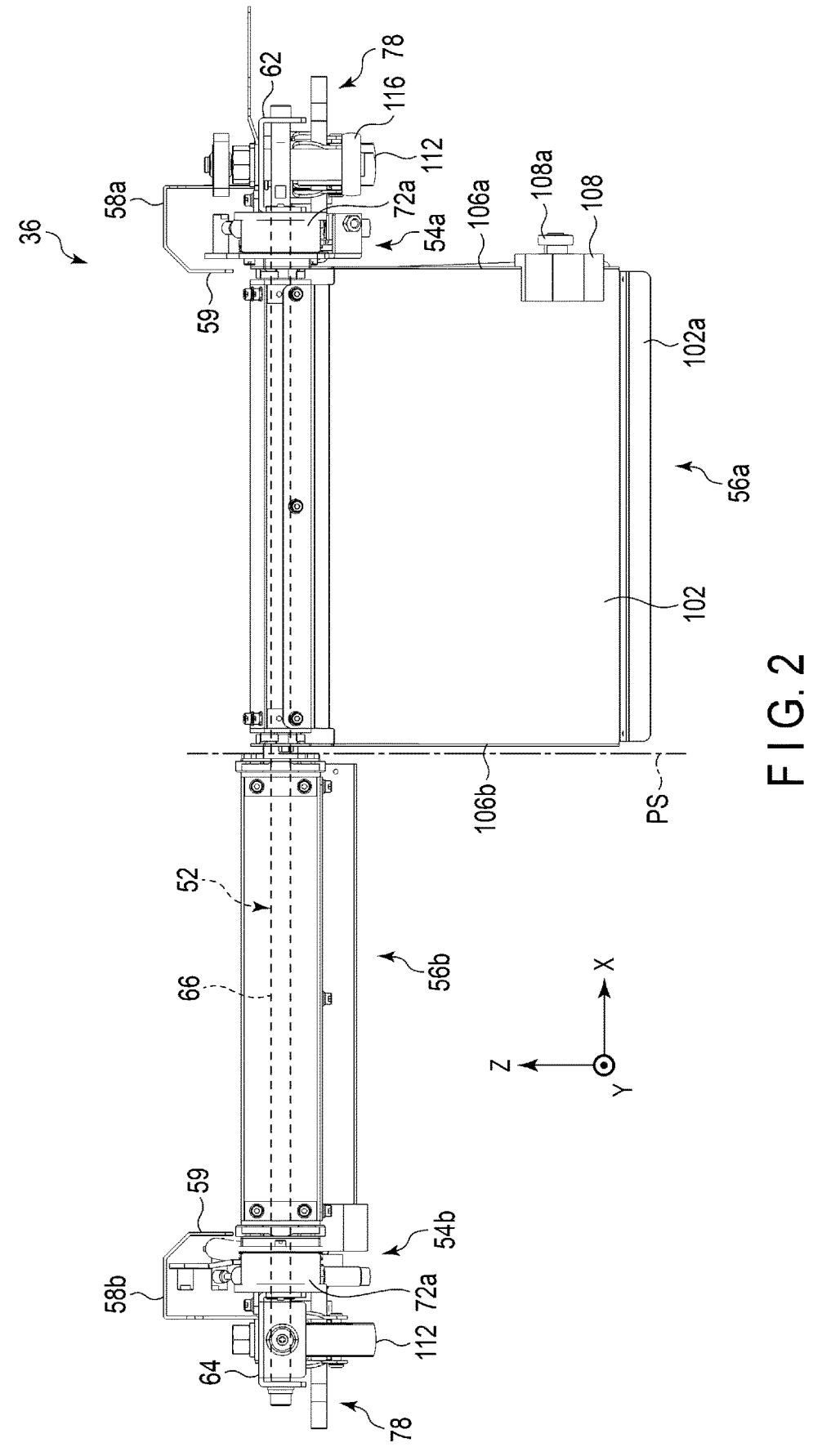
F I G. 2

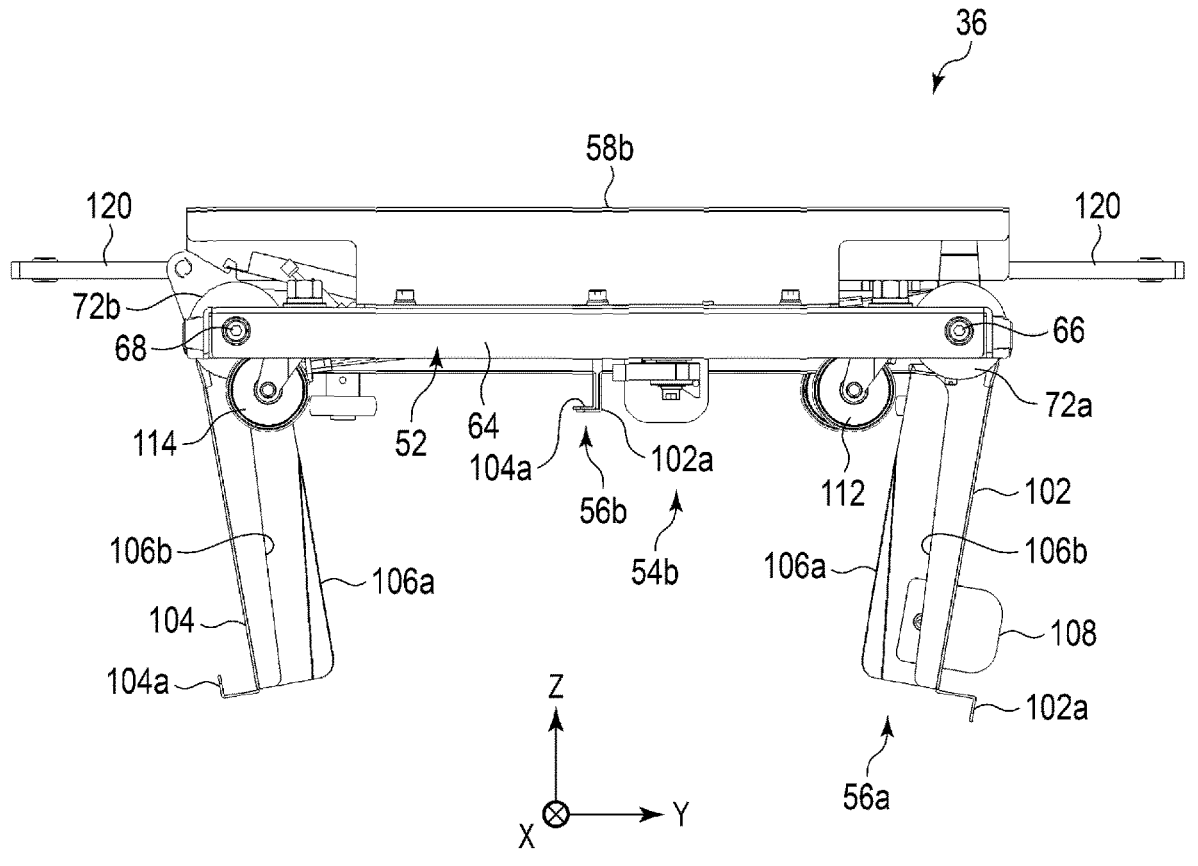
F I G. 4

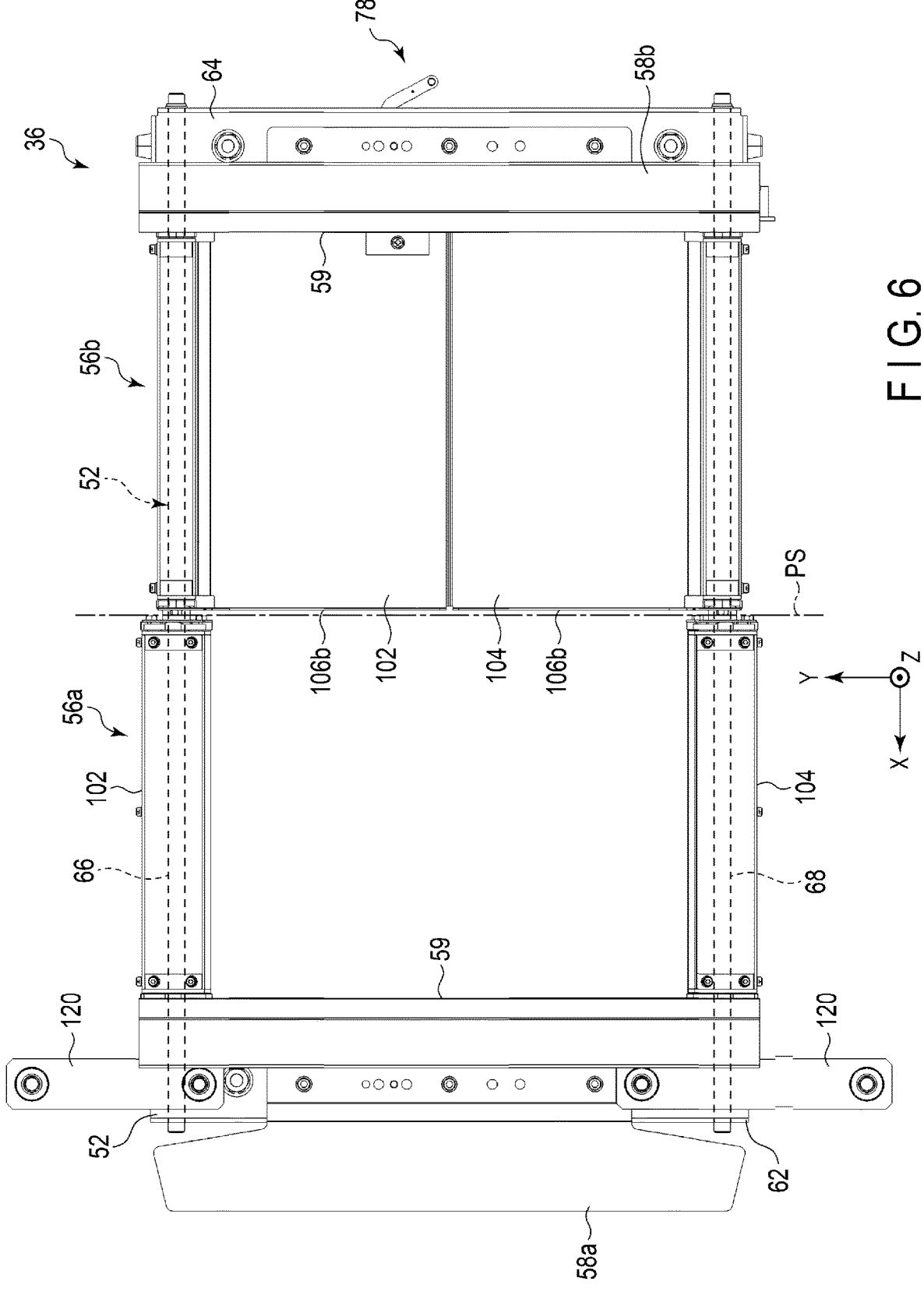
F I G . 6

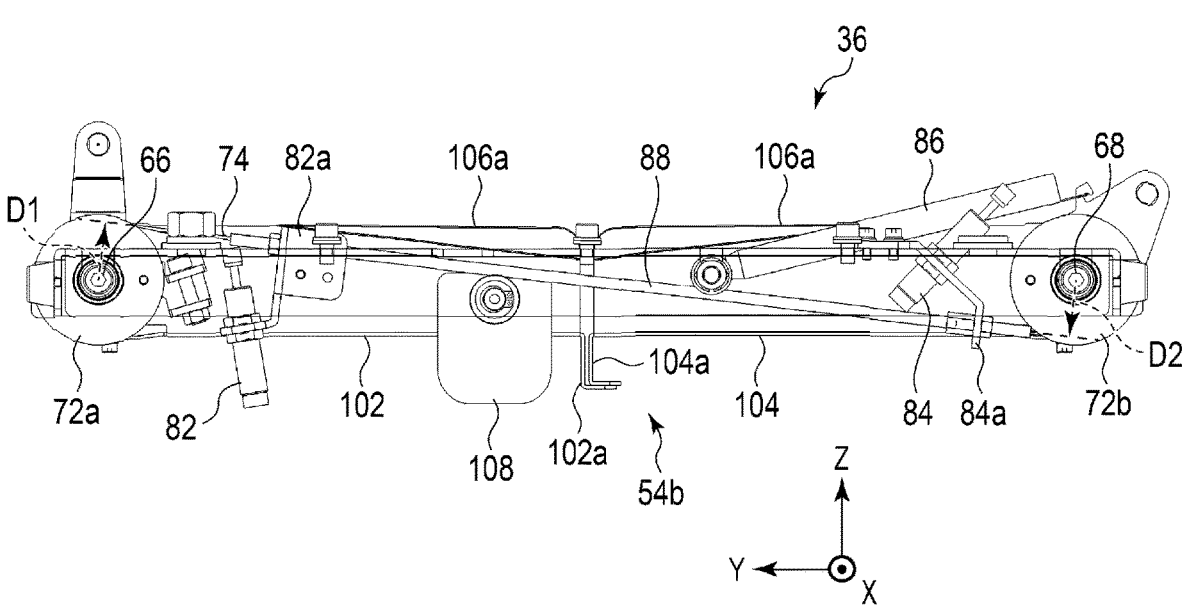
F I G. 11
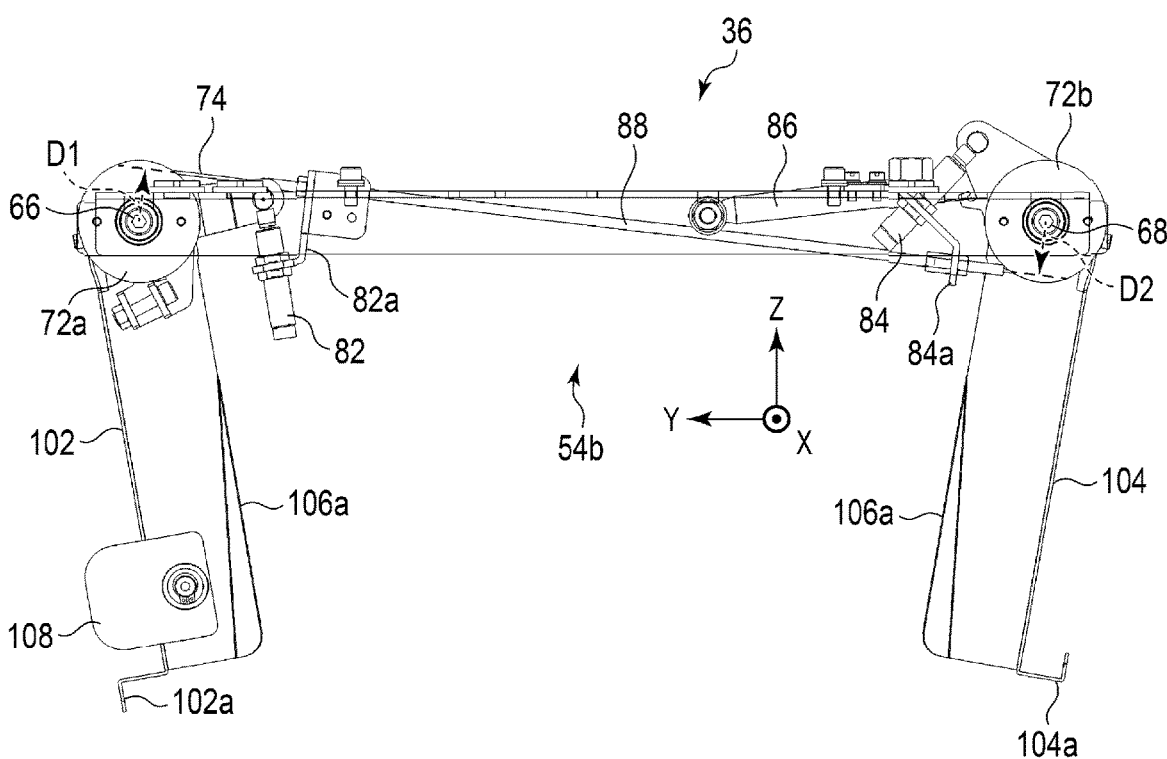
F I G. 12

TRAY FOR PHYSICAL DISTRIBUTION SORTER AND ARTICLE SORTING APPARATUS

CROSS REFERENCE TO RELATED APPLICATIONS

This application is a Continuation Applications of PCT Application No. PCT/JP2022/038062, filed Oct. 12, 2022, and based upon and claiming the benefit of priority from prior Japanese Patent Application No. 2021-170943, filed Oct. 19, 2021, the entire contents of all of which are incorporated herein by reference.

FIELD

Embodiments of the present invention relate to a tray for a physical distribution sorter and an article sorting apparatus.

BACKGROUND

For example, a tray for a physical distribution sorter called a bomb-bay tray is known. Such trays are arranged at appropriate intervals on an annular track, for example, and move in a predetermined direction on the track. The tray has a two-part rotating plate that forms a substantially planar placement surface in a state where an article is placed, and is opened downward in a double-open (biparting) shape when the article is sorted. In the tray, an opening/closing operation of the two-part rotating plate is interlocked by a link mechanism using a rod. In this tray, the article placed on the two-part rotating plate is sorted into a desired sorting chute disposed on a lower side of the tray between the parts of the two-part rotating plate when the parts of the two-part rotating plate are opened in a double-open manner. Further, this tray is configured so that, when the parts of the two-part rotating plate are closed, in conjunction with the closing of one rotating plate while bringing the one rotating plate into contact with a guide having a slope shape ascending along the traveling direction of the tray, the other rotating plate is closed.

BRIEF DESCRIPTION OF THE DRAWINGS

FIG. 1 is a schematic view illustrating an article sorting apparatus according to an embodiment.

FIG. 2 is a front view of a tray of the article sorting apparatus according to the embodiment.

FIG. 4 is a left side view of the tray illustrated in FIGS. 2 and 3.

FIG. 6 is a plan view of the tray illustrated in FIGS. 2 to 5.

FIG. 11 is a schematic view of a state in which a first placement part of the tray illustrated in FIGS. 2 to 7 is at a closed position as viewed from the same direction as in FIG. 5.

FIG. 12 is a schematic view of a state in which the first placement part of the tray illustrated in FIGS. 2 to 7 is at an opened position as viewed from the same direction as in FIG. 5.

DETAILED DESCRIPTION

Figure 3:
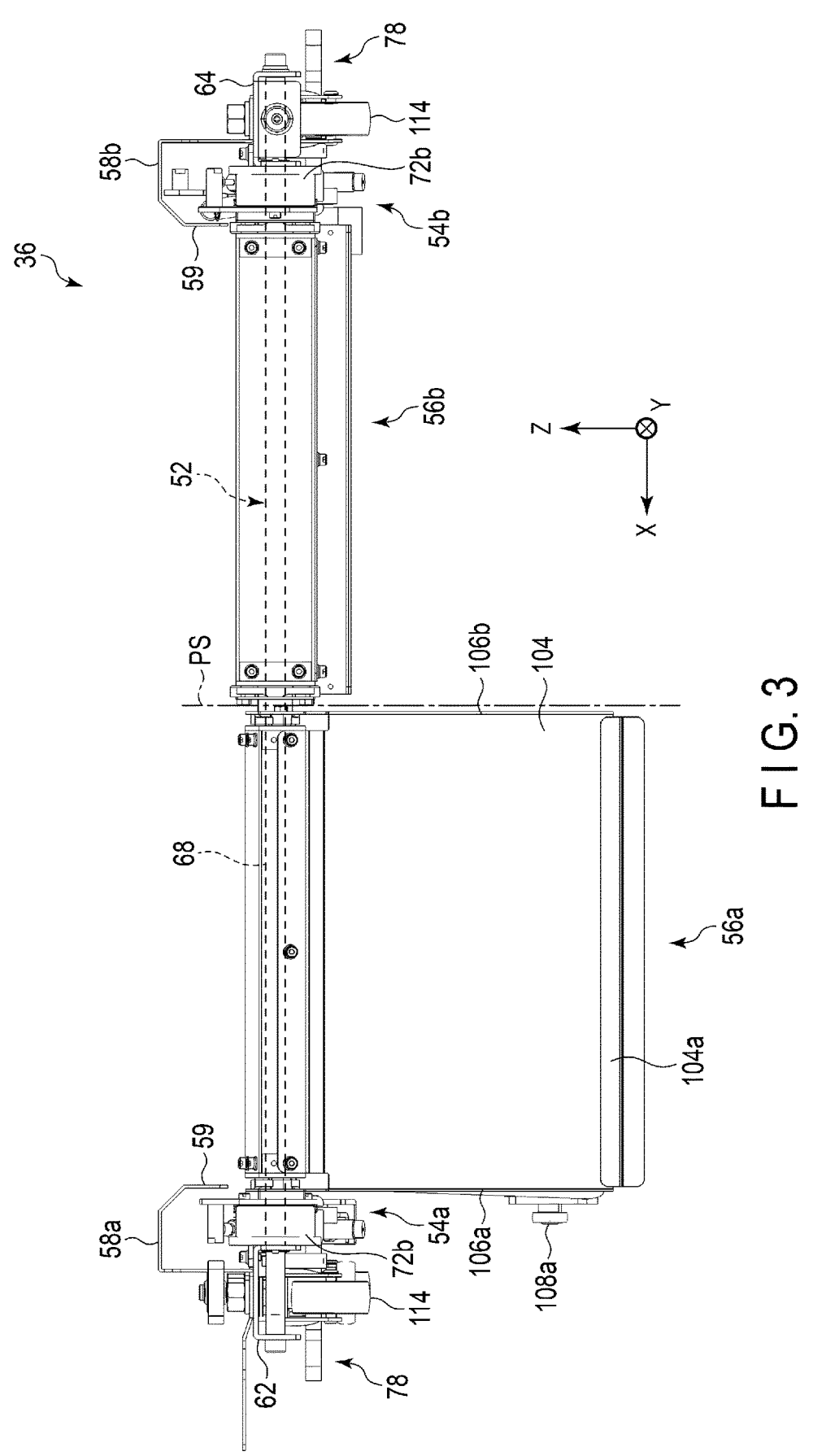
FIG. 3 is a rear view of the tray illustrated in FIG. 2.

An object of an embodiment is to provide a tray for a physical distribution sorter and an article sorting apparatus that can be reduced in weight.

According to the embodiment, a tray for a physical distribution sorter includes: a frame body, first and second pulleys, first and second rotating plates, and a wire. The frame body is configured to move in a predetermined direction on a track of the physical distribution sorter. The first and second pulleys rotate about a predetermined axis with respect to the frame body. The first rotating plate is configured to rotate with rotation of the first pulley. The second rotating plate is configured to rotate with rotation of the second pulley. The wire is wound around the first pulley and the second pulley. When the wire is unwound from the second pulley and wound around the first pulley, the first rotating plate and the second rotating plate rotate and close. And when the wire is unwound from the first pulley and wound around the second pulley, the first rotating plate and the second rotating plate rotate and open in a double-open manner.

An article sorting apparatus 10 according to an embodiment will be described with reference to FIGS. 1 to 13.

The article sorting apparatus 10 according to the present embodiment includes a physical distribution sorter 12 and an accumulation portion 14 disposed adjacent to the physical distribution sorter 12.

The physical distribution sorter 12 according to the present embodiment is formed as what is called a bomb-bay sorter. The physical distribution sorter 12 includes a track 22, a control device (article sorting control device) 24, a drive unit 26, an article input portion 28, an information reader 30, and a plurality of actuators (first switching units) 32. The physical distribution sorter 12 includes a guide path 34 for switching a lock part 78 to a lock position between the accumulation portion 14 and the article input portion 28 on the downstream side of the position where the accumulation portion 14 is disposed. The physical distribution sorter 12 further includes trays (transport carts) 36 for the physical distribution sorter that travel on the track 22 of the physical distribution sorter 12.

The track 22 includes, for example, a pair of rails 22a and 22b. The pair of rails 22a and 22b is formed in an annular shape spaced apart from each other by, for example, a predetermined distance. In the present embodiment, one rail 22a is on an outer side, and the other rail 22b is on an inner side. A plurality of trays 36 are placed on the pair of rails 22a and 22b in a state of straddling the pair of rails 22a and 22b. The trays 36 circulate in the track 22.

The control device 24 controls operations of the drive unit 26, the information reader 30, and the actuator 32. The control device 24 includes a processor, a read-only memory (ROM), a random-access memory (RAM), an auxiliary storage device, a communication interface, and an input/output unit. The processor corresponds to a central part of a computer that performs processing such as calculation and control necessary for article processing. The processor executes control to implement various functions on the basis of a program such as system software, application software, or firmware stored in at least one of the ROM and the auxiliary storage device. The processor is, for example, a central processing unit (CPU), a micro processing unit (MPU), or a digital signal processor (DSP). Alternatively, the processor is a combination of a plurality of these.

The drive unit 26 moves the plurality of trays 36 in a predetermined direction along the pair of rails 22a and 22b and circulates the track 22. The drive unit 26 is controlled by the control device 24, that is, the moving speed of the tray 36 is controlled.

The article input portion 28 is provided at a predetermined position of the pair of rails 22a and 22b. When the tray 36 is arranged in the article input portion 28, an article is placed on the tray 36 via a person or using an appropriate conveyor or the like.

The information reader 30 is provided adjacent to the downstream side of the article input portion 28. The information reader 30 includes, for example, a camera (scanner). The information reader 30 captures an image of an article from an upper surface, a side surface, and a lower surface of the article with a camera, for example, and outputs image information to the control device 24. Further, the information reader 30 measures the size, shape, weight, and the like of the conveyed article, and outputs article measurement information obtained by the measurement to the control device 24.

The control device 24 assigns an article detection ID to each detected article on the basis of a signal from the information reader 30 and article detection signals from a plurality of other article detection sensors. The control device 24 traces a conveyance (movement) of each article to which the article detection ID is assigned, and detects or estimates where each article is located. The control device 24 monitors a movement amount of the pair of rails 22a and 22b on the basis of a signal from a rotary encoder that detects the movement amount of the pair of rails 22a and 22b. For example, the control device 24 detects the number of circulations of the pair of rails 22a and 22b. Further, the control device 24 can also detect the number of circulations of each article by combining a trace of the conveyance of each article and monitoring of the movement amount of the pair of rails 22a and 22b.

The actuator 32 is used as an unlocking mechanism for unlocking the lock part 78. A plurality of actuators 32 are provided on each of the outer side of the rail 22a and the inner side of the rail 22b at appropriate intervals along the moving direction of the rails 22a and 22b. In the present embodiment, the actuators 32 are arranged to face the outside of the rail 22a and the inside of the rail 22b. They are operated when the lock part 78 of the tray 36 to be described later is unlocked depending on the information read by the information reader 30.

As the actuator 32, for example, a solenoid that moves upward by energization and returns to an original position by downward spring bias by non-energization, or the like is used. The pair of actuators 32 facing each other across the track 22 is operated independently, but may be operated at the same time as necessary.

The accumulation portion 14 is disposed adjacent to the actuator 32. The accumulation portion 14 includes, for example, a plurality of sorting chutes 42 corresponding to a plurality of sorting destinations, and chutes 44 that send an article to each of the sorting chutes 42. A pair of chutes 44 is provided between the pair of actuators 32 facing each other with the track 22 interposed therebetween. The pair of chutes 44 inclines, for example, with the center between the pair of rails 22a and 22b as a watershed. The sorting chute 42 receives an article from each chute 44.

Figure 5:
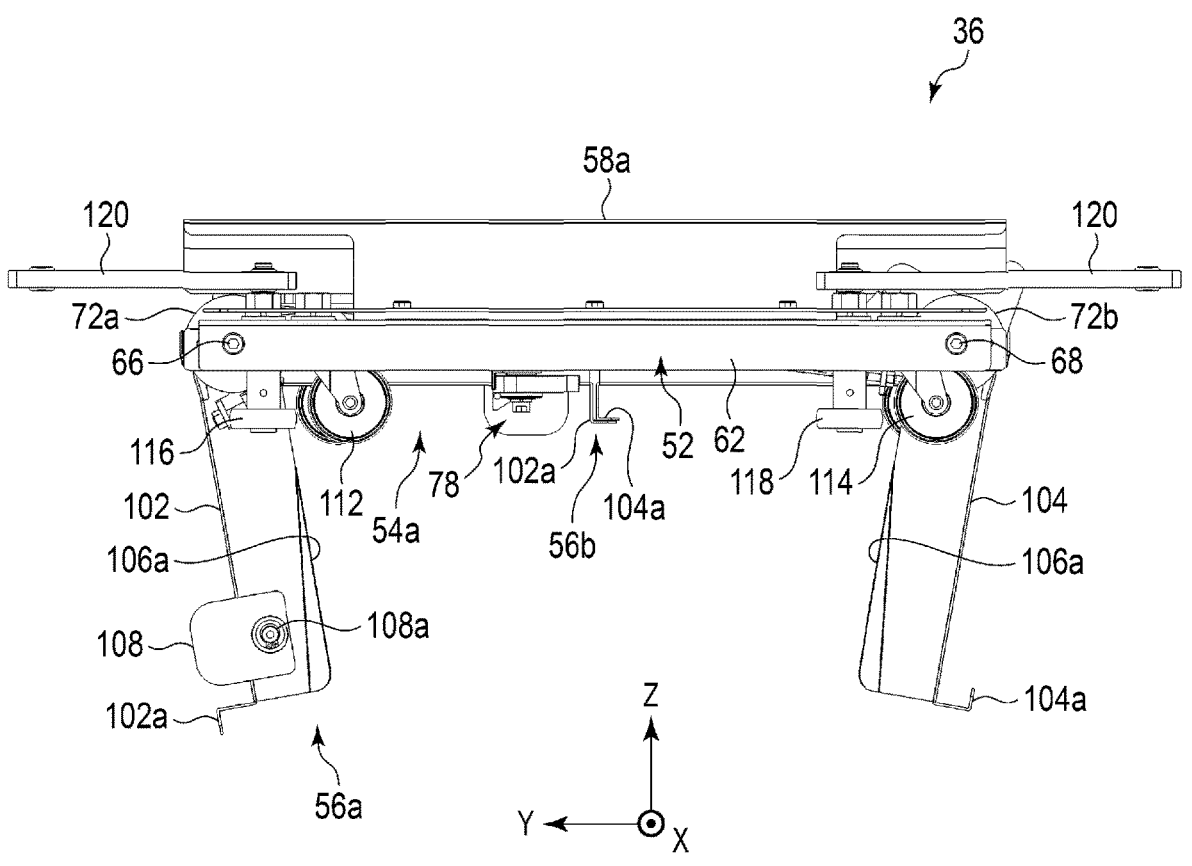
FIG. 5 is a right side view of the tray illustrated in FIGS. 2 to 4.
Figure 7:
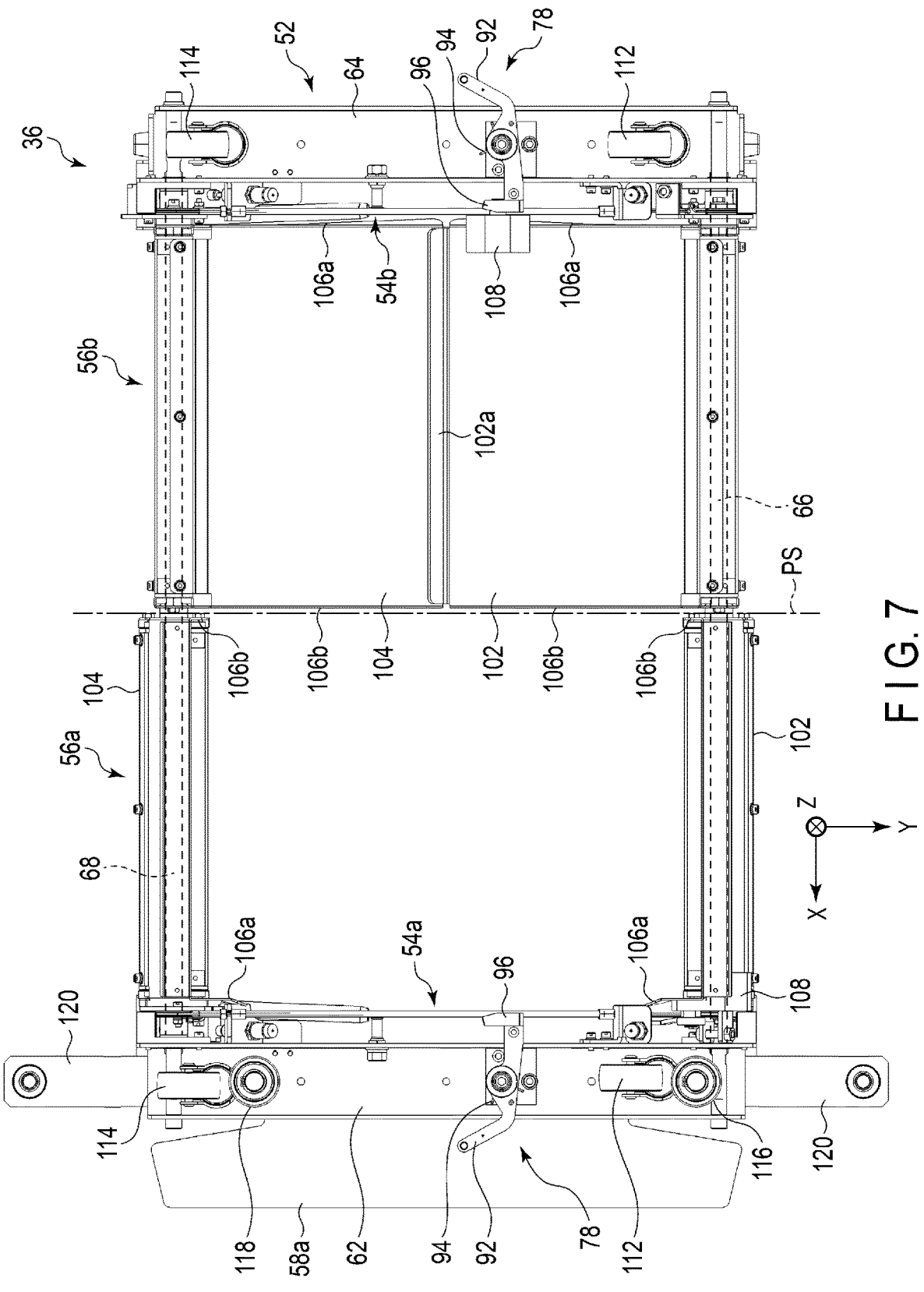
FIG. 7 is a bottom view of the tray illustrated in FIGS. 2 to 6.

FIGS. 2 to 7 are six-sided views of the tray 36. FIG. 2 is a front view, FIG. 3 is a rear view, FIG. 4 is a left side view, FIG. 5 is a right side view, FIG. 6 is a plan view, and FIG. 7 is a bottom view. Here, an XYZ orthogonal coordinate system is set for the tray 36 as illustrated in FIGS. 2 to 7.

The tray 36 used for the bomb-bay sorter 12 is formed as a bomb-bay tray in which a bottom portion (a rotating plate 102 or 104 to be described later) can be opened and closed in a double-open (biparting) shape. The bomb-bay sorter 12 conveys the article, opens the bottom portion at the timing when the bomb-bay tray 36 reaches the target sorting chute 42 or the chute 44 that feeds the article to the target sorting chute 42, and drops the article toward the target sorting chute 42 or the target chute 44.

As illustrated in FIGS. 2 to 7, the tray 36 includes a frame 52, first and second movable parts 54a and 54b, first and second placement parts 56a and 56b, and first and second tray covers 58a and 58b.

The frame 52 of the tray 36 moves in a predetermined direction on the track 22 of the physical distribution sorter 12. The frame 52 includes a first frame body 62 that moves along the outer rail 22a, a second frame body 64 that moves along the inner rail 22b, and first and second shafts 66 and 68 that couple the first frame body 62 and the second frame body 64.

A longitudinal direction of the first and second frame bodies 62 and 64 is along a Y axis. The first frame body 62 is disposed on a +X axis side with respect to the second frame body 64. The first and second shafts 66 and 68 are along an X axis. The first shaft 66 is disposed on a +Y axis side with respect to the second shaft 68.

The first and second frame bodies 62 and 64 are formed in, for example, a quadrangular prism shape and are separated in parallel. The first and second frame bodies 62 and 64 face each other in the longitudinal direction. The first and second frame bodies 62 and 64 each include one end (front end) on the +Y axis side and the other end (rear end) on a −Y axis side. The first shaft 66 is fixed to one end (front end) of each of the first and second frame bodies 62 and 64. The second shaft 68 is fixed to the other end (rear end) of each of the first and second frame bodies 62 and 64. The first shaft 66 and the second shaft 68 each extend in the X axis direction, that is, are spaced apart in parallel. The first shaft 66 and the second shaft 68 face each other in the longitudinal direction. Thus, the frame 52 is formed in a rectangular shape by four members of the first frame body 62, the second frame body 64, the first shaft 66, and the second shaft 68. Therefore, a rectangular space in which an article is dropped is formed in the frame 52.

Note that, although outer shapes of the first shaft 66 and the second shaft 68 are preferably columnar shapes, as long as first and second pulleys 72a and 72b to be described later are rotatable, the outer shapes may be formed in an appropriate polygonal columnar shape, or may be a cylindrical shape or an appropriate polygonal cylindrical shape.

The first movable part 54a is provided in the first frame body 62. The first movable part 54a is provided between the first frame body 62 and the first placement part 56a. The second movable part 54b is provided in the second frame body 64. The second movable part 54b is provided between the second frame body 64 and the second placement part 56b.

The frame 52, the first and second movable parts 54a and 54b, and the first and second placement parts 56a and 56b are symmetrical with respect to a virtual plane parallel to a YZ plane indicated by reference sign PS in FIGS. 2, 3, 6, and 7. Thus, one side of the first and second movable parts 54a and 54b and the first and second placement parts 56a and 56b will be described, the same reference signs will be appropriately assigned in FIGS. 2 to 7, and the description of the other side will be omitted.

Figure 8:
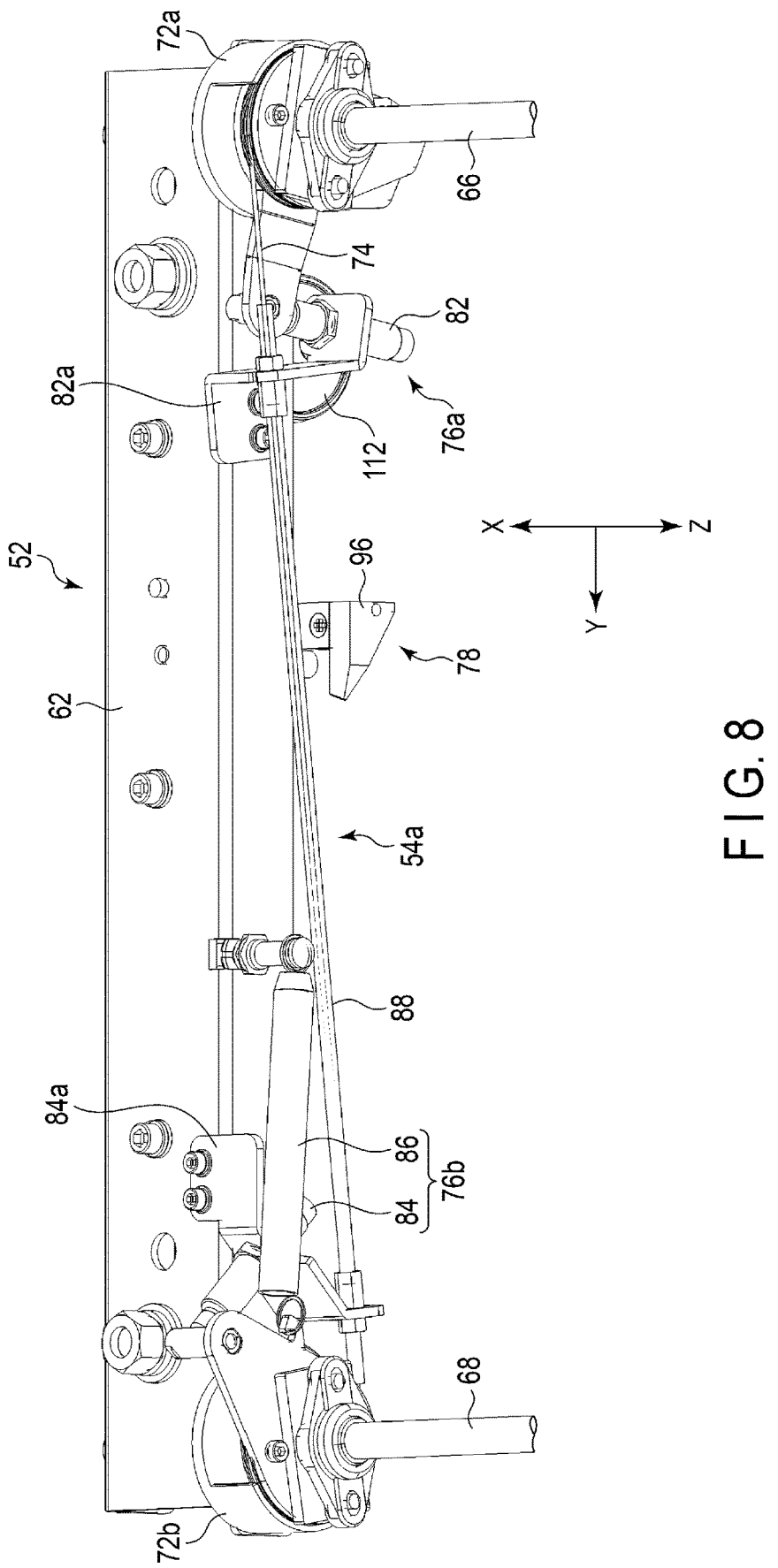
FIG. 8 is a schematic perspective view illustrating a part of the tray illustrated in FIGS. 2 to 7 as viewed from above.
Figure 9:
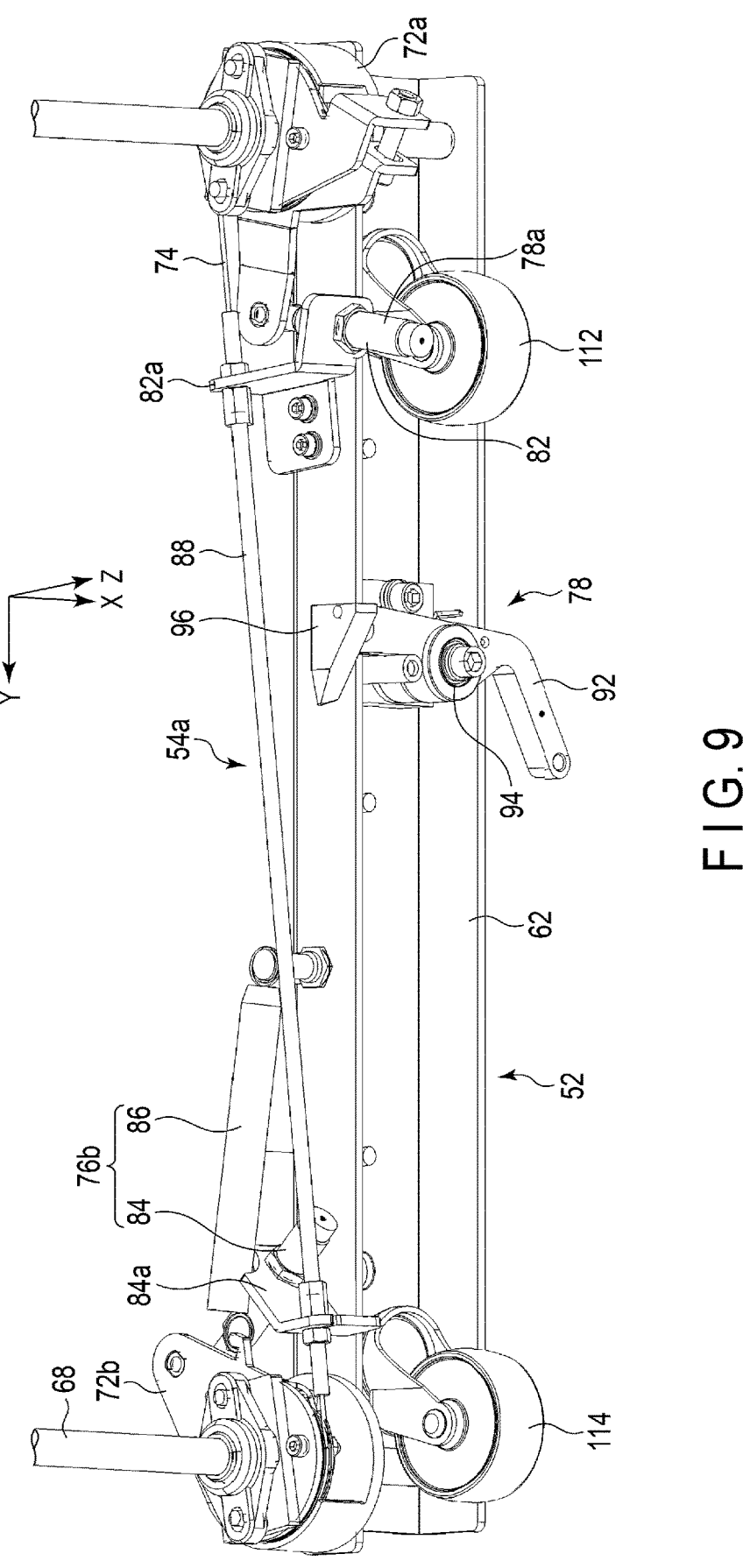
FIG. 9 is a schematic perspective view illustrating a part of the tray illustrated in FIGS. 2 to 7 as viewed from below.
Figure 10:
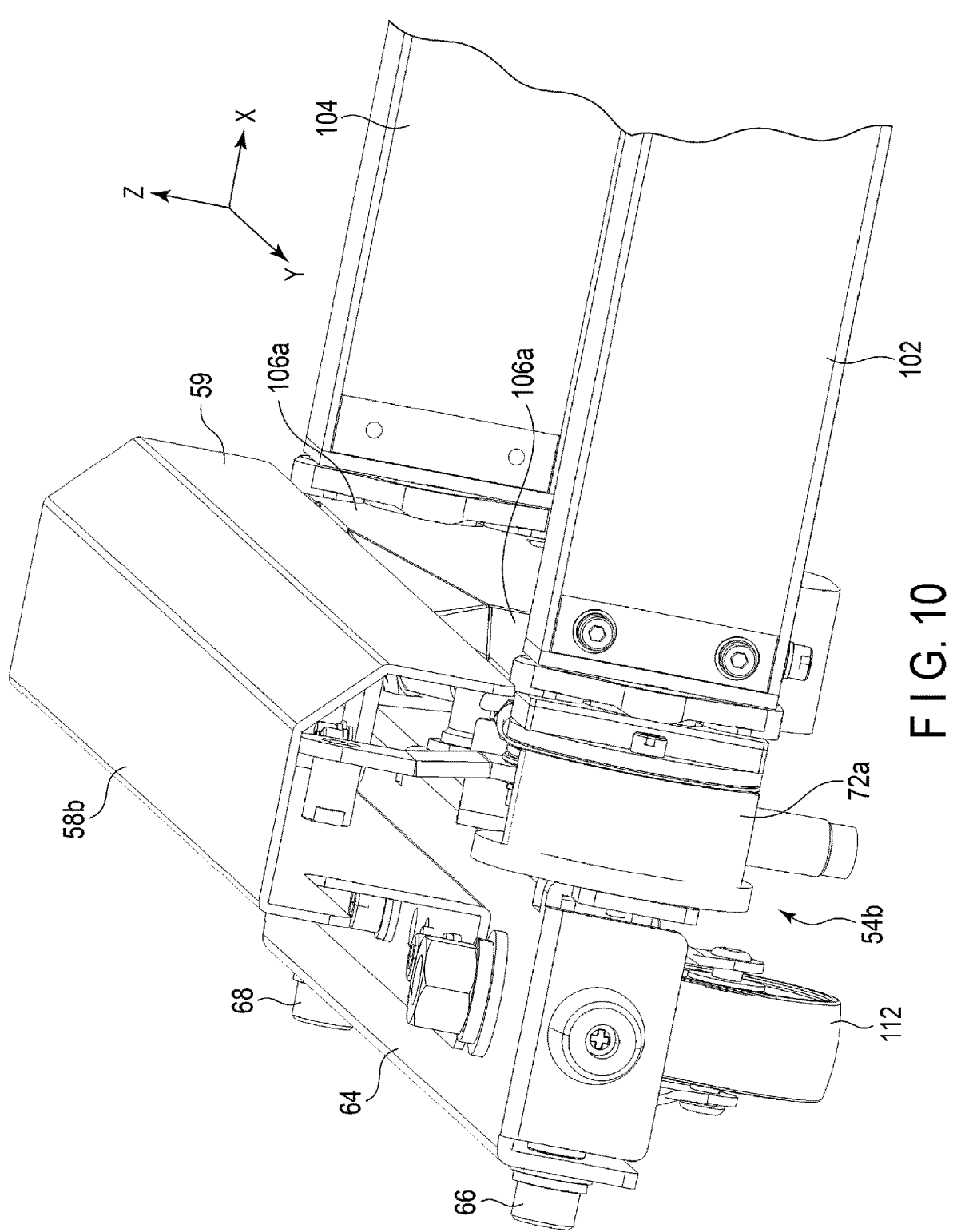
FIG. 10 is a schematic perspective view of a part of the tray illustrated in FIGS. 2 to 7 as viewed from the front (forward) side.

FIGS. 8 and 9 are perspective views of the tray 36 in which the first placement part 56a and the first tray cover 58a are not illustrated. FIG. 10 is a schematic perspective view of the second frame body 64, the second placement part 56b, and the second tray cover 58b as viewed from the front (forward) side.

FIG. 11 is a schematic view of a state in which the first placement part 56a of the tray 36 is at a closed position as viewed from the same direction as in FIG. 5. FIG. 12 is a schematic view of a state in which the first placement part 56a of the tray 36 is at an opened position as viewed from the same direction as in FIG. 5.

Figure 13:
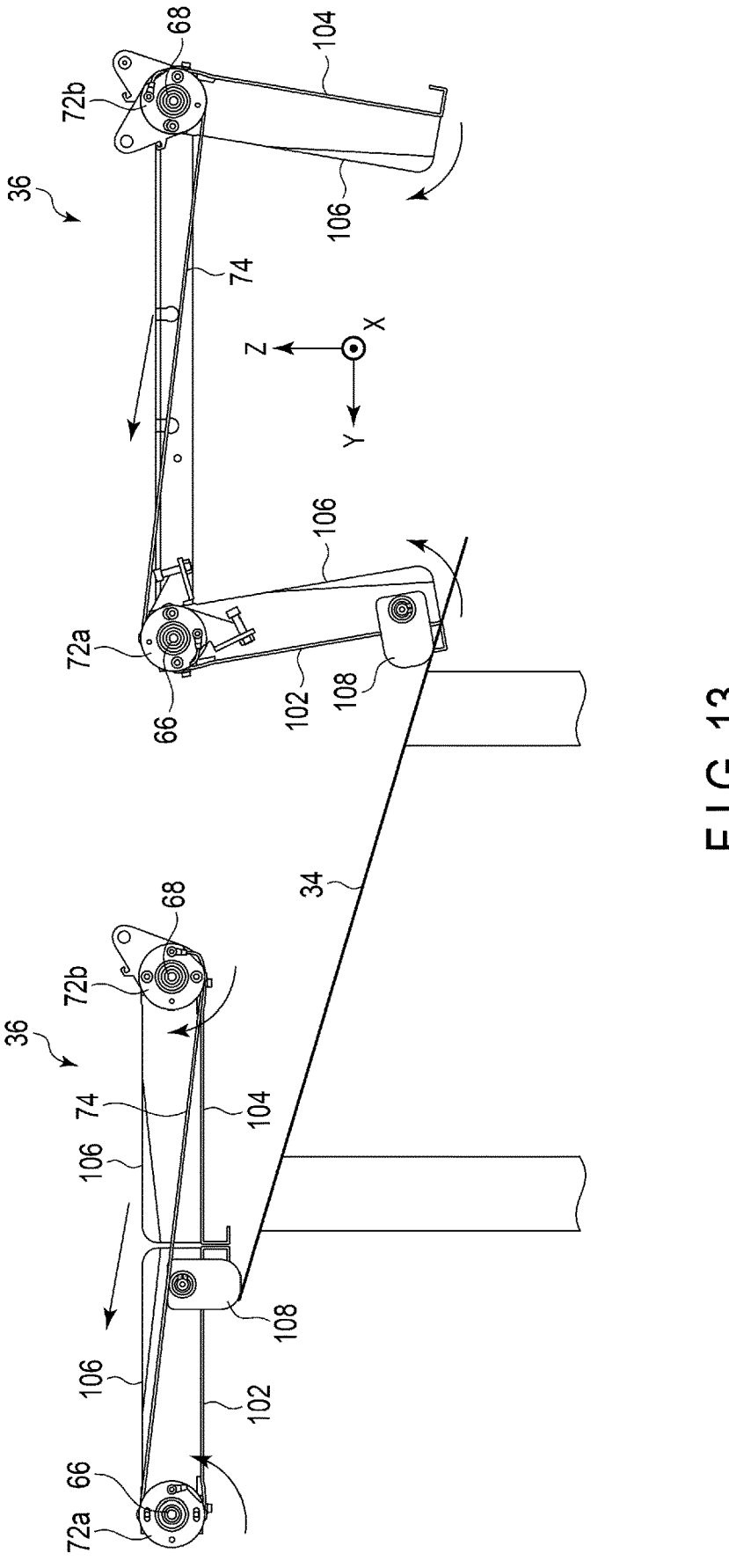
FIG. 13 is a schematic view illustrating a state in which the first placement part of the tray illustrated in FIGS. 2 to 7 is switched from the opened position to the closed position by a guide path.

FIG. 13 is a diagram illustrating that the first placement part 56a of the tray 36 shifts from the opened position to the closed position as it moves along the guide path 34.

As illustrated in FIG. 8, the first movable part 54a includes first and second pulleys 72a and 72b, a wire (first wire) 74 connecting between the first and second pulleys 72a and 72b, first and second buffer portions 76a and 76b, and the lock part 78.

The first pulley 72a has a central axis (rotation axis) in a direction along the X axis. The first pulley 72a is disposed concentrically with the first shaft 66 and is rotatable about the axis of the first shaft 66. The second pulley 72b has a central axis (rotation axis) in a direction along the X axis. The second pulley 72b is disposed concentrically with the second shaft 68 and is rotatable about the axis of the second shaft 68. The first and second pulleys 72a and 72b preferably include the same outer diameter.

One end of the wire 74 is connected to the first pulley 72a. The other end of the wire 74 is connected to the second pulley 72b. One end and the other end of the wire 74 are connected to the first pulley 72a and the second pulley 72b, respectively, so that when a first rotating plate 102 rotates clockwise about the X axis, a second rotating plate 104 rotates counterclockwise about the X axis, and when the first rotating plate 102 rotates counterclockwise about the X axis, the second rotating plate 104 rotates clockwise about the X axis, as viewed from a predetermined direction. One end of the wire 74 is in contact with an outer periphery of the first pulley 72a at a tangent line in a first direction D1 (see FIGS. 11 and 12) in a radial direction of the first pulley 72a with respect to the rotation axis of the first pulley 72a, and is wound along the outer periphery of the first pulley 72a toward the side opposite to the first direction D1. One end of the wire 74 passes through, for example, an upper side (the first direction with respect to the rotation axis) of the rotation axis of the first pulley 72a, and is wound downward toward the side opposite to the other end and fixed. The other end of the wire 74 is in contact with an outer periphery of the second pulley 72b at a tangent line in a second direction D2 (see FIGS. 11 and 12) in a radial direction of the second pulley 72b with respect to the rotation axis of the second pulley 72b, and is wound along the outer periphery of the second pulley 72b toward the side opposite to the second direction D2. The other end of the wire 74 passes through, for example, a lower side (the second direction with respect to the rotation axis) of the rotation axis of the second pulley 72b, and is wound upward toward the side opposite to the one end and fixed. For example, the wire 74 is stretched with an appropriate tension so that the upper side of the first pulley 72a is a tangent line and the lower side of the second pulley 72b is a tangent line.

The first buffer portion 76a buffers an impact when the first rotating plate 102 is opened downward. The first buffer portion 76a includes a first damper 82 constituted by, for example, air or oil. One end of the first damper 82 is supported by a bracket 82a fixed to one end portion of the first frame body 62, and the other end of the first damper 82 is supported by the first pulley 72a. Thus, the first buffer portion 76a suppresses rapid rotation of the first pulley 72a.

The second buffer portion 76b buffers an impact when the second rotating plate 104 is opened downward. The second buffer portion 76b includes a second damper 84 constituted by, for example, air or oil, and a biasing member 86 such as a spring. One end of the second damper 84 is supported by a bracket 84a fixed to the other end of the first frame body 62, and the other end of the second damper 84 is supported by the second pulley 72b. Further, one end of the biasing member 86 is supported by the first frame body 62, and the other end of the biasing member 86 is supported by the second pulley 72b. For example, a tension coil spring is used as the biasing member 86. That is, the biasing member 86 is provided between the second pulley 72b and the first frame body 62, pulls the second pulley 72b toward the first pulley 72a side, and applies an appropriate tension to the wire 74.

A wire cover 88 is disposed between the brackets 82a and 84a. As an example, the wire cover 88 is a sheath (tube) through which the wire 74 is inserted. One end of the wire cover 88 is supported by the first frame body 62 or the bracket 82a, and the other end of the wire cover 88 is supported by the first frame body 62 or the bracket 84a. Since the brackets 82a and 84a are fixed to the first frame body 62, the wire cover 88 is supported so as not to move with respect to the first frame body 62.

The wire cover 88 allows the wire 74 to move along an axial direction of the wire 74 with respect to the wire cover 88. When the wire 74 moves along the wire cover 88, the wire cover 88 covers an outer periphery of the wire 74. Note that the wire cover 88 may be formed as, for example, a recessed groove formed in the first frame body 62 or a half pipe supported by the first frame body 62 instead of the sheath. When the wire cover 88 is formed as a recessed groove, for example, the wire cover may be formed in the first frame body 62.

The lock part 78 is provided between one end and the other end of the first frame body 62. The lock part 78 is provided at a position facing the outer rail 22a. The lock part 78 includes a rotating lever 92, a biasing body 94, and an engaging body 96 that rotates together with the rotating lever 92.

The lock part 78 is provided on the first frame body 62. The lock part 78 can be switched between a lock position where the first rotating plate 102 and the second rotating plate 104 are locked at a closed position so that it is possible to place the article on the first rotating plate 102 and the second rotating plate 104, and an unlock position where the first rotating plate 102 and the second rotating plate 104 are unlocked at an opened position so that the article falls from between the first rotating plate 102 and the second rotating plate 104.

The rotating lever 92 is rotatable about, for example, an axis along a vertical direction (Z axis) of the first frame body 62. The rotating lever 92 projects outward from the first frame body 62 (in a −X axis direction with respect to the first frame body 62). The rotating lever 92 can contact/avoid contact with the actuator 32 depending on the state of the actuator 32.

The biasing body 94 biases the rotating lever 92 in a predetermined direction. The biasing body 94 biases the rotating lever 92 to protrude outside the first frame body 62.

The engaging body 96 is integrated with the rotating lever 92. The engaging body 96 can be engaged with the first placement part 56a. The engaging body 96 has an inclined surface, and an engaging piece 108a to be described later is movable between an engagement position (lock position) and a disengagement position (unlock position).

As illustrated in FIGS. 2 to 7, the first placement part 56a includes the parts of the two-part rotating plate 102 and 104 that form a substantially planar placement surface in a state where an article is placed and opens downward in a double-open manner when the article is sorted. One of the parts of the two-part rotating plate 102 and 104 is first rotating plate 102, and the other is second rotating plate 104. The first pulley 72a is disposed between the first rotating plate 102 and the first frame body 62. The first rotating plate 102 is fixed to the first pulley 72a and is rotatable together with the first pulley 72a about the axis of the first shaft 66. The second pulley 72b is disposed between the second rotating plate 104 and the first frame body 62. The second rotating plate 104 is fixed to the second pulley 72b and is rotatable together with the second pulley 72b about the axis of the second shaft 68. For example, the first rotating plate 102 and the second rotating plate 104 include substantially the same shape and substantially the same size.

When the first rotating plate 102 and the second rotating plate 104 of the first placement part 56a are in the closed positions, substantially half of the opening on the inner side of the frame 52 is closed. When the first rotating plate 102 and the second rotating plate 104 of the first placement part 56a are in the opened positions, substantially half of the opening on the inner side of the frame 52 is opened.

The first rotating plate 102 includes a first fitting member 102a. The first fitting member 102a is provided on an end surface of the first rotating plate 102 opposite to the first shaft 66. The second rotating plate 104 includes a second fitting member 104a. The second fitting member 104a is provided on an end surface of the second rotating plate 104 opposite to the second shaft 68. As illustrated in FIGS. 4 and 5, the first fitting member 102a and the second fitting member 104a are fitted when the first placement part 56a is in the closed position, and are separated when the first placement part 56a is in the opened position.

When the wire 74 is unwound from the second pulley 72b and wound around the first pulley 72a, the first and second rotating plates 102 and 104 rotate with respect to the first and second shafts 66 and 68, respectively, and close. The state of the first placement part 56a at this time is referred to as a close position or a closed position. When the state of the first placement part 56a is at the close position or the closed position, the article can be placed on the first and second rotating plates 102 and 104.

When the wire 74 is unwound from the first pulley 72a and wound around the second pulley 72b, the first and second rotating plates 102 and 104 rotate in a predetermined direction (downward) in a double-open manner with respect to the first and second shafts 66 and 68, respectively. The state of the first placement part 56a at this time is referred to as an open position or an opened position. When the state of the first placement part 56a is at the opened position or the opened position, the article can be dropped from between the first and second rotating plates 102 and 104. Thus, the first rotating plate 102 and the second rotating plate 104 being at the opened position (open position) means a state in which a space for dropping an article is formed between the first rotating plate 102 and the second rotating plate 104.

Note that, in the tray 36 of FIGS. 2 to 7, the second placement part 56b is at the closed position, and the first placement part 56a is at the opened position.

The first rotating plate 102 and the second rotating plate 104 of the first placement part 56a each include a pair of protruding plates 106a and 106b. The protruding plates 106a and 106b protrude with respect to the article placement surface of the first rotating plate 102 and the second rotating plate 104 of the first placement part 56a. One protruding plate (partition wall) 106a is provided on an end surface on the first movable part 54a side of the first rotating plate 102 and the second rotating plate 104, that is, on the first frame body 62 side (+X axis side), and is formed as a partition wall between the first frame body 62 and the first movable part 54a and an article. The other protruding plate 106b is provided on an end surface on the second movable part 54b side of the first rotating plate 102 and the second rotating plate 104, that is, on the second frame body 64 side (−X axis side), and is formed as a partition wall with the second placement part 56b. A projecting height (height in the Z axis direction) of one protruding plate 106a with respect to the first rotating plate 102 at the closed position is higher than a projecting height (height in a Z axis direction) of the other protruding plate 106b.

The buffer body 108 is provided on the first rotating plate 102. As the buffer body 108, for example, a polyamide synthetic resin (nylon) is used. The buffer body 108 is provided at or near an end on a back surface side of the first rotating plate 102 on a side opposite to the side supported by the first shaft 66. The buffer body 108 is formed to have a width smaller than a width of the first rotating plate 102, and is provided at a position close to the first frame body 62 and the first movable part 54a. The buffer body 108 is provided with the engaging piece 108a to be engaged with the engaging body 96 of the lock part 78. The engaging piece 108a has a central axis along the X axis and is formed in a substantially columnar shape protruding in the +X axis direction with respect to the buffer body 108 and the protruding plate 106a. Note that a distal end surface of the engaging piece 108a with respect to the buffer body 108 is defined at a position not reaching the first frame body 62.

A pair of wheels 112 and 114 is provided at a position facing the rail 22a in the first frame body 62. One wheel 112 is provided at one end of the first frame body 62, and the other wheel 114 is provided at the other end. The pair of wheels 112 and 114 has a rotation axis in a direction along the X axis.

A pair of guide wheels 116 and 118 is provided at a position facing the rail 22a in the first frame body 62. The guide wheel 116 is provided adjacent to the wheel 112 at one end of the first frame body 62, and the guide wheel 118 is provided adjacent to the wheel 114 at the other end. The pair of guide wheels 116 and 118 has a rotation axis in a direction along the Z axis.

Note that the guide wheel 116 supports a coupling member 120 coupled to the guide wheel 118 of the tray 36 on the front side. The coupling member 120 coupled to the guide wheel 118 of the rear tray 36 is supported by the guide wheel 116. Thus, a large number of the plurality of trays 36 are coupled by the coupling member 120. The plurality of trays 36 is maintained at a predetermined distance by the coupling member 120.

The first tray cover 58*a* that covers an upper side of the first movable part 54*a* and an upper side of the first frame body 62 is fixed to the first frame body 62. A region of the first tray cover 58*a* on the second placement part 56*b* side (−X axis side) includes, for example, a plate-shaped body 59 having a surface parallel to the YZ plane. The plate-shaped body 59 is closer to the second placement part 56*b* than the first frame body 62, and extends in the Y axis direction. The plate-shaped body 59 continuously covers a region above the central axis of the first pulley 72*a* and a region above the central axis of the second pulley 72*b*. The plate-shaped body 59 is formed, for example, substantially flush with the protruding plate 106*a*. The surface of the plate-shaped body 59 on the second placement part 56*b* side and the surfaces of the protruding plate 106*a* on the first rotating plate 102 and the second rotating plate 104 side are preferably formed to be flush with each other or formed by a shift of several millimeters in the X axis direction. Thus, when the first placement part 56*a* is in the closed position, the plate-shaped body 59 of the tray cover 58*a* protects the first movable part 54*a* in cooperation with the pair of protruding plates 106*a*. Therefore, when the first placement part 56*a* is in the closed position, the plate-shaped body 59 and the protruding plate 106*a* have a small step and a small gap.

Note that, in the present embodiment, the first tray cover 58*a* and the second tray cover 58*b* have different shapes. The first tray cover 58*a* has a portion covering the lock part 78 from above, whereas the second tray cover 58*b* has no portion covering the lock part 78 from above. The first tray cover 58*a* and the second tray cover 58*b* may have the same shape.

Next, the operation of the article sorting apparatus 10 will be described.

The plurality of trays 36 move in a predetermined direction on the rails 22*a* and 22*b* of the track 22. Since the plurality of trays 36 is coupled by the coupling member 120, the trays move in the predetermined direction at predetermined intervals. Since the tray 36 according to the present embodiment does not require a power source (drive source), it is possible to reduce the weight of each tray 36 by the amount of the drive source. In addition, since a power source (drive source) is unnecessary for the tray 36, wiring for flowing electric energy between the track 22 and the tray 36 is also unnecessary.

In the tray 36 entering the article input portion 28, both the first rotating plate 102 and the second rotating plate 104 of the first and second placement parts 56*a* and 56*b* are in the closed positions. The article is placed on one or both of the first and second placement parts 56*a* and 56*b* of the tray 36 from the article input portion 28.

When first placement part 56*a* is in the closed position, an appropriate article having a bottom surface having an area smaller than the combined size of the placement surfaces of the first rotating plate 102 and the second rotating plate 104 is placed on first rotating plate 102 and second rotating plate 104 of first placement part 56*a*.

Note that, when both the first placement part 56*a* and the second placement part 56*b* are in the closed positions, it is possible to place an appropriate article having a bottom surface having an area smaller than the combined size of the placement surfaces of the first rotating plate 102 and the second rotating plate 104 of the first placement part 56*a* and the placement surfaces of the first rotating plate 102 and the second rotating plate 104 of the second placement part 56*b*.

At this time, the article can also be placed on the four protruding plates 106*b*. Thus, the tray 36 can be used for articles having various sizes equal to or smaller than the combined size of the first and second placement parts 56*a* and 56*b*. Then, the tray may selectively use the first placement part 56*a* and the second placement part 56*b* depending on the size of one article, or may use both the first placement part 56*a* and the second placement part 56*b*. The tray 36 according to the present embodiment can be used in various ways for articles of various sizes. For example, when articles are placed on the first and second placement parts 56*a* and 56*b*, two articles can be sorted by one tray 36, and the operation speed is improved as compared with the case of sorting one article by one tray.

Note that placing an article on both the first and second placement parts 56*a* and 56*b* includes placing an article on each of the first and second placement parts 56*a* and 56*b*, and placing one article in cooperation with the first and second placement parts 56*a* and 56*b*. Thus, in the tray 36 according to the present embodiment, the article can be placed on one of the first and second placement parts 56*a* and 56*b* depending on the size of the article, the article can be placed on each of the first and second placement parts 56*a* and 56*b*, and the first and second placement parts 56*a* and 56*b* can cooperate to place one article.

Here, an example in which an article is placed on the first rotating plate (third rotating plate) 102 and the second rotating plate (fourth rotating plate) 104 of the second placement part 56*b* of the tray 36 will be described. Note that, when the article is placed on one or both of the first and second placement parts 56*a* and 56*b* of the tray 36 from the article input portion 28, the tray 36 continues to move in a predetermined direction.

As illustrated in FIG. 10, in the protruding plate 106*a* provided on the first and second rotating plates 102 and 104 of the second placement part 56*b* at the closed position, the surfaces on the first and second rotating plates 102 and 104 side and the surface on the first placement part 56*a* side (+X axis side) of the plate-shaped body 59 of the second tray cover 58*b* are substantially flush with each other. Thus, for example, even when the tray 36 moves along the rails 22*a* and 22*b* of the physical distribution sorter 12 in a state where the bag-shaped article is placed on the second placement part 56*b* at the closed position, a part of the article hardly enters between the second tray cover 58*b* and the protruding plate 106*a*.

Even if a part of the article enters between the plate-shaped body 59 of the second tray cover 58*b* and the protruding plate 106*a*, the wire (second wire) 74 is covered with the wire cover 88, and the wire cover 88 is supported by each of the brackets 82*a* and 84*a*, and does not move in the axial direction. Even if a part of the article enters between the plate-shaped body 59 of the second tray cover 58*b* and the protruding plate 106*a*, it is merely arranged between the brackets 82*a* and 84*a*. A portion of the wire (second wire) 74 of the second movable part 54*b* from the one end of the wire cover 88 to the first pulley (third pulley) 72*a* is at a position farther from the article than the bracket 82*a*. Similarly, a portion of the wire (second wire) 74 of the second movable part 54*b* from the one end of the wire cover 88 to the second pulley (fourth pulley) 72*b* is at a position farther from the article than the bracket 84*a*. Thus, it is difficult for a part of the article to come into contact with the wire 74 of the second movable part 54*b*, the first pulley 72*a*, or the second pulley 72*b*. Therefore, according to the movement of the wire 74, it is possible to prevent a part of the article from coming into contact and the article from being pulled by the wire 74.

The control device 24 acquires the information of the article on the tray 36 by the information reader 30. The information reader 30 captures an image of an article from an upper surface and a side surface of the article with a camera, for example, and outputs image information to the control device 24. Further, the information reader 30 measures the size, shape, and the like of the conveyed article, and outputs article measurement information obtained by the measurement to the control device 24. Furthermore, the information reader 30 reads the article ID from the article, and outputs the read article ID to the control device 24.

The control device 24 assigns an article detection ID to each detected article on the basis of a signal from the information reader 30 and the article detection signals from the plurality of other article detection sensors, traces the conveyance (movement) of each article, and detects or estimates where each article is located. Furthermore, the control device 24 monitors the movement amount of the pair of rails 22a and 22b on the basis of the signal from the rotary encoder that detects the movement amount of the pair of rails 22a and 22b. For example, the control device 24 detects the number of circulations of the pair of rails 22a and 22b. Further, the control device 24 can also detect the number of circulations of each article by combining a trace of the conveyance of each article and monitoring of the movement amount of the pair of rails 22a and 22b.

The control device 24 determines to sort the article into, for example, the sorting chute indicated by reference sign 42a in the sorting chute 42 in FIG. 1. In this case, the chute corresponding to the sorting chute 42a is denoted by reference sign 44a.

The tray 36 moves along the movement of the rails 22a and 22b. In the tray 36, even at a position where the rails 22a and 22b are bent, the tray 36 moves in a predetermined direction by the wheels 112 and 114 and the guide wheels 116 and 118. That is, the tray 36 is circularly conveyed.

The control device 24 operates the actuator 32 immediately before the tray 36 on which the article to be sorted is placed moves onto the chute 44a corresponding to the predetermined sorting chute 42a on the basis of the information acquired by the information reader 30. The control device 24 energizes the actuator 32 to cause the actuator 32 to protrude upward (+Z axis direction), for example. Thus, the actuator 32 comes into contact with the rotating lever 92 of the lock part (second lock part) 78 of the tray 36 that has moved onto the chute 44a corresponding to the predetermined sorting chute 42a to press the rotating levers 92 rearward (in the −Y axis direction).

Note that the timing at which the actuator 32 is moved upward (in the +Z axis direction) by energization is after the rotating lever 92 of the lock part 78 of the preceding tray 36 coupled by the coupling member 120 passes immediately above the actuator 32 to be operated.

Immediately after the actuator 32 comes into contact with the rotating lever 92 and the actuator 32 rotates the rotating lever 92, the actuator 32 and the rotating lever 92 are no longer in contact with each other due to the movement of the tray 36. Immediately after the actuator 32 and the rotating lever 92 are no longer in contact with each other, the rotating lever 92 and the engaging body 96 are returned to their original positions by the biasing body 94.

Immediately after estimating that the actuator 32 has come into contact with the rotating lever 92, the control device 24 stops energization to the actuator 32 and pulls the actuator 32 downward (in the −Z direction) to a height position at which it does not come into contact with the rotating lever 92.

When the rotating lever 92 rotates, the engaging body 96 rotates together with the rotating lever 92, and the engagement between the engaging body 96 of the lock part 78 and the engaging piece 108a provided on the buffer body 108 of the first rotating plate 102 is released. At this time, due to the gravity of the article, the first rotating plate 102, and the second rotating plate 104, the first rotating plate 102 and the second rotating plate 104 of the second placement part 56b are opened from the close position to the double-open position, and the article falls from between the first rotating plate 102 and the second rotating plate 104 of the second placement part 56b to the chute 44a. The article is placed from the chute 44a into the sorting chute 42a.

Here, when the first rotating plate 102 is opened from the close position (see FIG. 11) to the open position (see FIG. 12), the first pulley (third pulley) 72a of the second movable part 54b is rotated to unwind the wire (second wire) 74. When the second rotating plate 104 is opened, the second pulley (fourth pulley) 72b is rotated to pull (wind) the wire (second wire) 74. Since the first rotating plate 102 and the second rotating plate 104 of the second placement part 56b start to be opened substantially at the same time, the timing at which the first pulley 72a unwinds the wire 74 and the timing at which the second pulley 72b tows the wire 74 substantially coincide with each other. The biasing member 86 is used to appropriately maintain the tension applied to the wire 74 when the second pulley 72b is pulled toward the first pulley 72a and the first and second rotating plates 102 and 104 are opened. Thus, the biasing member 86 suppresses the wire 74 from loosening between the first pulley 72a and the second pulley 72b of the second movable part 54b. Therefore, when the first and second rotating plates 102 and 104 of the second placement part 56b are switched from the close position to the open position, the biasing member 86 prevents the wire 74 from being detached from the second pulley 72b.

Then, the wire 74 is kept in contact with the tangent of the first pulley 72a and the tangent of the second pulley 72b. Thus, when first rotating plate 102 and second rotating plate 104 are opened and closed, positional displacement of the wire 74 with respect to the frame 52 (deflection of the wire 74) can be ignored.

When the first pulley 72a rotates to unwind the wire 74 to open the first rotating plate 102, the first damper 82 makes the rotation speed of the first rotating plate 102 lower than that when the first damper 82 is not provided. Further, when the second pulley 72b rotates to pull the wire 74 to open the second rotating plate 104, the second damper 84 makes the rotation speed of the second rotating plate 104 lower than that when the second damper 84 is not provided. As described above, when the first rotating plate 102 and the second rotating plate 104 are opened, the first buffer portion 76a and the second buffer portion 76b suppress loads on the first movable part 54a and the second movable part 54b.

Note that the buffer body 108 of the first rotating plate 102 can be used as, for example, a cushion or the like for contact with the preceding tray 36. Thus, even when the first rotating plate 102 of the tray 36 separated by the coupling member 120 and the second rotating plate 104 of the preceding tray 36 temporarily come into contact with each other, the load at the time of contact between the first rotating plate 102 of the tray 36 and the second rotating plate 104 of the preceding tray 36 is reduced.

As illustrated in FIG. 13, the tray 36 approaches the guide path 34 located at a higher position toward the front side at the position where the second placement part 56b is opened. When the buffer body 108 of the tray 36 moves in the predetermined direction while being in contact with the guide path 34, the first rotating plate 102 closes. When the first rotating plate 102 moves in the closing direction, the first pulley 72a pulls (winds) the wire 74. Thus, the second pulley 72b unwinds the wire 74. Therefore, the second rotating plate 104 coupled to the second pulley 72b is closed together when the first rotating plate 102 is closed.

As the first rotating plate 102 is closed, the engaging piece 108a provided on the buffer body 108 comes close to and comes into contact with the inclined surface of the engaging body 96 of the lock part 78. Then, the engaging piece 108a provided on the buffer body 108 moves on the inclined surface of the engaging body 96 of the lock part 78 and is placed on the engaging body 96 of the lock part 78. At this time, the engaging piece 108a provided on the buffer body 108 is placed on the engaging body 96 of the lock part 78 against the biasing force of the biasing body 94. Thus, when the engaging piece 108a provided on the buffer body 108 is placed on the engaging body 96 of the lock part 78, the engaging piece 108a provided on the buffer body 108 is engaged on the engaging body 96 of the lock part 78 by the biasing force of the biasing body 94. Thus, the lock part 78 is provided on the second frame body 64, and locks the first rotating plate 102 and the second rotating plate 104 so that an article can be placed on the first rotating plate 102 and the second rotating plate 104. That is, the second placement part 56b is returned to the close position.

In this manner, in a state where the first placement part 56a and the second placement part 56b maintain the closed positions, the tray 36 is directed toward the article input portion 28 along the rails 22a and 22b. In this manner, the tray 36 circulates on the track 22.

Note that, when the control device 24 outputs that there is no sorting destination to sort the article in the sorting chute 42 for the article placed on the tray 36, the control device 24 outputs an error. The error output may be after the tray 36 has cycled through the track 22, for example at least once. In this case, the image information of the article on the tray 36 is acquired again by the information reader 30. Then, the control device 24 outputs an error again when there is no sorting destination to sort the articles in the sorting chute 42.

A large number of the trays 36 are placed and moved on the track 22 of the article sorting apparatus 10. Then, since an article is placed on each tray 36, in order to move each tray 36, the driving force of the rails 22a and 22b can be smaller the lighter the weight of each tray 36. In the tray 36 according to the present embodiment, by switching the lock part 78 from the lock position to the unlock position, the first pulley 72a, the second pulley 72b, and the wire 74 of the first movable part 54a can be moved in response to opening of the first and second rotating plates 102 and 104 of the first placement part 56a.

Here, for example, when the rod of the link mechanism is used, the rod is required to withstand a force in a direction deviating from the axial direction of the rod and to have proof strength, that is, rigidity against buckling of the rod. Thus, in order to impart rigidity to the rod, it is likely to be required to form an appropriate material thickness. Thus, the rod of the link mechanism is highly required to be formed as a component having an appropriate weight. On the other hand, when the wire 74 of the tray 36 according to the present embodiment is used, it is not necessary to consider buckling as long as it has tensile strength. The wire 74 only needs to be formed as a load-bearing component that can withstand the opening and closing operation of the first placement part 56a and can withstand the weight of the article placed on the first placement part 56a.

For example, the wire 74 of the tray 36 of the present embodiment can be formed to be lighter than a rod as a solid metal part. Thus, in the case of using the wire 74, the weight can be reduced as compared with the case of using the rod of the link mechanism. Therefore, for example, the tray 36 can be easily reduced in weight as compared with the case of the link mechanism. This may have a greater impact as the number of trays 36 on the track 22 of the physical distribution sorter 12 increases. Thus, by using the first and second pulleys 72a and 72b and the wire 74 like the first and second movable parts 54a and 54b of the tray 36 according to the present embodiment, it is possible to reduce the weight of the tray 36.

Further, in the tray 36 according to the present embodiment, even when the first and second pulleys 72a and 72b of the second movable part 54b rotate and the wire 74 moves in the axial direction, the positions of the first and second pulleys 72a and 72b and the position of the wire 74 continue to maintain the same position with respect to the second frame body 64. Thus, when the second tray cover 58b is used, a space in consideration of the operation range of the rod as in the link mechanism becomes unnecessary. Thus, the space between the second frame body 64 and the second tray cover 58b can be formed small. Thus, the structure of the second movable part 54b contributes to weight reduction of the second tray cover 58b.

Further, in the tray 36 according to the present embodiment, in cooperation with the plate-shaped body 59 of the second tray cover 58b, the protruding plates 106a provided on the first and second rotating plates 102 and 104 of the second placement part 56b can be used as partition walls. When the second placement part 56b is at the close position, the plate-shaped body 59 of the second tray cover 58b and the protruding plate 106a can cooperate to separate the first and second pulleys 72a and 72b and the wire 74 from the article placed on the second placement part 56b. At this time, the wire 74 moves in the axial direction of the wire 74, but can be kept at that position. Further, the wire 74 is protected by the wire cover 88. Thus, even if the second placement part 56b is switched from the close position to the open position, the article can be prevented from touching the wire 74. Therefore, when the second placement part 56b is switched from the close position to the open position, the article can be prevented from being caught by the wire 74. Even if the wire cover 88 is not provided, since the gap between the protruding plate 106a and the plate-shaped body 59 of the second tray cover 58b is formed to be small when the second placement part 56b is at the closed position, it is possible to prevent a part of the article from entering the gap between the protruding plate 106a and the plate-shaped body 59 of the second tray cover 58b. Thus, by using the second movable part 54b according to the present embodiment, it is possible to suppress the occurrence of a defect such as the article being caught on the tray 36 even when the article is chuted to the chute 44 from the state of being placed on the tray 36. Therefore, according to the present embodiment, it is possible to provide a tray 36 for the physical distribution sorter and the article sorting apparatus 10 that can easily process various articles.

Further, in the tray 36 according to the present embodiment, an active drive member by electric energy such as a power motor is unnecessary. Thus, the tray 36 can be reduced in weight, and the cost of the power motor and the like can be reduced.

In the present embodiment, the first and second frame bodies 62 and 64 have been described as quadrangular prisms. The first and second frame bodies 62 and 64 are preferably formed in an appropriate shape having four surfaces such as an H steel shape in addition to a quadrangular prism shape.

In the present embodiment, the example in which the first movable part 54*a* is provided between the first frame body 62 and the first placement part 56*a* has been described. That is, the example in which the first movable part 54*a* is provided in the −X axis direction with respect to the first frame body 62 has been described. The first movable part 54*a* is also preferably provided in the +X axis direction with respect to the first frame body 62. Similarly, in the present embodiment, the example in which the second movable part 54*b* is provided between the second frame body 64 and the second placement part 56*b* has been described. That is, the example in which the second movable part 54*a* is provided in the +X axis direction with respect to the second frame body 62 has been described. The second movable part 54*b* is also preferably provided in the −X axis direction with respect to the second frame body 62.

In the present embodiment, the example has been described in which the parts of the two-part rotating plate 102 and 104 of the first placement part 56*a* are opened downward in a double-open manner. The direction in which the parts of the two-part rotating plate 102 and 104 are opened is not limited to the lower side, and is appropriately set.

The example has been described in which one end of the wire 74 passes through, for example, the upper side (the first direction with respect to the rotation axis) of the rotation axis of the first pulley 72*a*, and is wound downward toward the side opposite to the other end and fixed. In addition, the example has been described in which the other end of the wire 74 passes through, for example, the lower side (the second direction with respect to the rotation axis) of the rotation axis of the second pulley 72*b*, and is wound upward toward the side opposite to the one end and fixed. The rotation axes of the first pulley 72*a* and the second pulley 72*b* do not necessarily extend in the horizontal direction (the X axis direction or a direction along an XY plane). The rotation axes of the first pulley 72*a* and the second pulley 72*b* may extend so as to cross the horizontal direction (XY plane). As an example, the rotation axes of the first pulley 72*a* and the second pulley 72*b* may extend in the vertical direction (Z axis direction). Even in this case, one end of the wire 74 is wound around and fixed to the first pulley 72*a*, and the other end of the wire 74 is wound around and fixed to the second pulley 72*b*. In the present embodiment, the directions of the rotation axes of the first pulley 72*a* and the second pulley 72*b* can be appropriately set by using the wire 74. Thus, the directions of the first pulley 72*a* and the second pulley 72*b* can be set depending on the space in which the first pulley 72*a* and the second pulley 72*b* are arranged. The rotation axes of the first pulley 72*a* and the second pulley 72*b* may not be parallel to each other. In this manner, by using the wire 74, the directions of the first pulley 72*a* and the second pulley 72*b* can be freely set.

According to at least one embodiment described above, it is possible to provide a tray 36 for the physical distribution sorter and the article sorting apparatus 10 that can be reduced in weight.

While certain embodiments have been described, these embodiments have been presented by way of example only, and are not intended to limit the scope of the inventions. These novel embodiments may be embodied in various forms, and various omissions, replacements, and changes can be made thereon without departing from the spirit of the invention. The embodiments and their modifications are included in the scope and spirit of the invention and are included in the scope of the claimed inventions and their equivalents.

What is claimed is:

1. A tray for a physical distribution sorter, comprising:
a first frame body configured to move in a predetermined direction on a track of the physical distribution sorter;
a first pulley configured to rotate about a predetermined axis with respect to the first frame body;
a second pulley configured to rotate about the predetermined axis with respect to the first frame body;
a first rotating plate configured to rotate with rotation of the first pulley;
a second rotating plate configured to rotate with rotation of the second pulley;
a first wire wound around the first pulley and the second pulley, and configured to, when the first wire is unwound from the second pulley and wound around the first pulley, the first rotating plate and the second rotating plate rotate and close, and when the first wire is unwound from the first pulley and wound around the second pulley, the first rotating plate and the second rotating plate rotate and open in a double-open manner;
a first buffer portion provided between the first pulley and the first frame body that is configured to buffer an impact when the first rotating plate is opened; and
a second buffer portion provided between the second pulley and the first frame body that is configured to buffer an impact when the second rotating plate is opened,
wherein the second buffer portion includes:
a damper provided between the second pulley and the first frame body, and
a biasing member provided between the second pulley and the first frame body that biases the second pulley to be separated from the first pulley.

2. The tray according to claim 1, wherein
when the first wire is wound by the first pulley, the first wire is wound toward a side opposite to a first direction while being in contact at a tangent in the first direction in a radial direction of the first pulley with respect to a rotation axis of the first pulley, and
when the first wire is wound by the second pulley, the first wire is wound toward a side opposite to a second direction while being in contact at a tangent in the second direction in a radial direction of the second pulley with respect to a rotation axis of the second pulley.

3. The tray according to claim 1, wherein
the first pulley is provided between the first frame body and the first rotating plate, and
the second pulley is provided between the first frame body and the second rotating plate.

4. The tray according to claim 1, comprising:
a wire cover supported by the first frame body between the first pulley and the second pulley, covering an outer periphery of the first wire, and allowing movement along an axial direction of the first wire.

5. The tray according to claim 1, comprising:

a tray cover provided on the first frame body and covering at least a part of the first frame body, the first pulley, the second pulley, and the first wire.

6. The tray according to claim 5, wherein the tray cover includes a plate-shaped body facing a side of the first rotating plate and a side of the second rotating plate, and the first rotating plate and the second rotating plate are each provided with a partition wall that is configured to separate the first rotating plate and the second rotating plate from the first frame body, the first pulley, the second pulley, and the first wire in cooperation with the plate-shaped body at a position where the first rotating plate and the second rotating plate are closed, with the first wire being wound around the first pulley.

7. The tray according to claim 1, comprising:

a lock part provided on the first frame body, the lock part being configured to switch between a lock position where the first rotating plate and the second rotating plate are locked so as to place an article on the first rotating plate and the second rotating plate, and an unlock position where the article falls from between the first rotating plate and the second rotating plate.

8. The tray according to claim 1, comprising:

a second frame body facing the first frame body;

a third pulley configured to rotate about a predetermined axis with respect to the second frame body;

a fourth pulley configured to rotate about the predetermined axis with respect to the second frame body;

a third rotating plate provided closer to the second frame body than the first rotating plate and configured to rotate with rotation of the third pulley;

a fourth rotating plate provided closer to the second frame body than the second rotating plate and configured to rotate with rotation of the fourth pulley; and a second wire wound around the third pulley and the fourth pulley, and configured to, when the second wire is unwound from the fourth pulley and wound around the third pulley, the third rotating plate and the fourth rotating plate rotate and close, and when the second wire is unwound from the third pulley and wound around the fourth pulley, the third rotating plate and the fourth rotating plate rotate and open in the double-open manner.

9. An article sorting apparatus comprising:

a physical distribution sorter including the tray according to claim 1; and a track on which the tray is configured to move.

\* \* \* \* \*